US006745981B1

(12) United States Patent
Rainer et al.

(10) Patent No.: US 6,745,981 B1
(45) Date of Patent: Jun. 8, 2004

(54) AIRCRAFT SENSOR POD ASSEMBLY

(75) Inventors: Stanley Irvin Rainer, Orlando, FL (US); Vito Richard Simone, Stuart, FL (US); Paul Arthur Fraser, Melbourne, FL (US)

(73) Assignee: Northrop Grummin Corporation, Los Angeles, CA (US)

( * ) Notice: Subject to any disclaimer, the term of this patent is extended or adjusted under 35 U.S.C. 154(b) by 0 days.

(21) Appl. No.: 10/373,459

(22) Filed: Feb. 25, 2003

(51) Int. Cl.[7] ............................................. B64C 1/36
(52) U.S. Cl. ............................. 244/118.1; 244/137.4; 343/705
(58) Field of Search ........................ 244/118.1, 137.4, 244/1 R, 55, 54, 139, 129.1; 343/705

(56) References Cited

U.S. PATENT DOCUMENTS

| 1,880,997 | A | * | 10/1932 | Stout | 244/54 |
|---|---|---|---|---|---|
| 2,980,909 | A | * | 4/1961 | Clanton, Jr. et al. | 343/705 |
| 3,045,236 | A | | 7/1962 | Colman et al. | 343/705 |
| 3,656,164 | A | * | 4/1972 | Rempt | 343/705 |
| 4,057,104 | A | | 11/1977 | Altoz | 165/35 |
| 4,509,709 | A | | 4/1985 | Utton et al. | 244/118.1 |
| 4,746,082 | A | * | 5/1988 | Syms et al. | 244/118.2 |
| 4,931,803 | A | * | 6/1990 | Shimko | 342/371 |
| 5,049,891 | A | | 9/1991 | Ettinger et al. | 343/705 |
| 5,238,208 | A | * | 8/1993 | Davis | 244/118.1 |

OTHER PUBLICATIONS

E–2C Hawkeye, 4 pages Grumman aircraft of 1992.*

* cited by examiner

*Primary Examiner*—Galen Barefoot
(74) *Attorney, Agent, or Firm*—Louis L. Dachs

(57) ABSTRACT

The invention is a sensor pod for mounting on the top surface of the fuselage of an aircraft. The pod it supported by right and left front supports and right and left rear supports that attach to the fuselage on either side of the longitudinal axis of the aircraft. A fifth structural support, aligned with the longitudinal axis of the aircraft, has a first end attached to the fuselage of the aircraft a second end attached to the sensor pod the aircraft.

8 Claims, 2 Drawing Sheets

AIRCRAFT SENSOR POD ASSEMBLY

BACKGROUND OF THE INVENTION

1. Field of the Invention

The invention relates to the field of aircraft and, in particular, to a sensor array pod mounted to the aircraft

2. Description of Related Art

Mounting sensors such as radar antennas on aircraft has significant advantages. The most obvious advantage is that when the aircraft is at high altitude, a single aircraft can cover a large area. In addition, an aircraft can be flown to the area of interest. Circular shaped radomes have been mounted on aircraft as illustrated in U.S. Pat. No. 3,045,236 "Rotatable Radomes For Aircraft" by P. A. Colman, et al. and U.S. Pat. No. 5,049,891 "Radome-Antenna Installation With Rotating Equipment Rack" by J. J. Ettinger, et al. However, these circular shaped radomes are limited to radar systems where the radar antenna is continuously rotated. Thus the incorporation of other types of sensor systems is limited.

In U.S. Pat. No. 4,057,104 "Temperature Controlled Airborne Electronic Assembly" by F. E. Aloz discloses an elongated pod mounted on the vertical stabilizer. This location severely limits the size and weight of the equipment that can be incorporated therein because of its effect on the center of gravity of the aircraft. U.S. Pat. No. 4,509,709 "Swinging Pod Antenna Mount" by C. G. Utton, et al. discloses an elongated extendable antenna pod mounted on lower side of the fuselage. However, its location severely limits the antenna coverage. Furthermore, the use of a mechanism to extend and retract the pod adds weight to the aircraft, decreasing aircraft utility.

Thus, it is a primary object of the invention to provide a sensor pod for installation on an aircraft.

It is another primary object of the invention to provide a sensor pod for installation on an aircraft that optimizes sensor field of view.

It is a further object of the invention to provide a sensor pod for installation on an aircraft that improves center of gravity management.

It is a still further object of the invention to provide a sensor pod for installation on an aircraft that minimizes the impact to the stability and control of the aircraft.

It is another object of the invention to provide a sensor pod for installation on an aircraft that is adaptable to multiple sensors.

SUMMARY OF THE INVENTION

The invention is a sensor pod assembly for an aircraft of the type having a fuselage with a longitudinal axis, wings, and control surfaces. In detail, the sensor pod includes an elongated pod having front and rear ends positioned above the fuselage. First and second front structural supports have first ends coupled to the fuselage of the aircraft on either side of the longitudinal axis thereof and second ends coupled to the front end of the pod. First and second rear structural supports have first ends coupled to the fuselage of the aircraft on either side of the longitudinal axis thereof and second ends coupled to the rear end of the pod.

A fifth structural support aligned with the longitudinal axis of the aircraft has a first end attached to the fuselage of the aircraft and a second end attached to the sensor pod. In one embodiment, first end of the fifth structural support is mounted to the fuselage between the front and rear structural supports and extends rearward with the second end attached to the sensor pod between the rear structural supports. In a second embodiment, the first end of the fifth structural support is mounted to the fuselage between the front and rear structural supports and extends forward with the second end is attached to the sensor pod between the front structural and rear structural support. The pod and structural supports have an aerodynamic shape to reduce drag.

The sensor pod includes an outer skin made at least partially from a material transparent to electromagnetic radiation. This includes the front and rear ends and top middle portion of the pod. This is required for one particular mission, a dish type transmitting and receiving communications antenna be mounted in the front and rear ends of the pod and an electronically steered array radar antenna is mounted in the upper middle section of the pod. It is also intended that this steered array radar antenna be rotatable about an axis parallel with the longitudinal axis of the pod.

The novel features which are believed to be characteristic of the invention, both as to its organization and method of operation, together with further objects and advantages thereof, will be better understood from the following description in connection with the accompanying drawings in which the presently preferred embodiments of the invention are illustrated by way of examples. It is to be expressly understood, however, that the drawings are for purposes of illustration and description only and are not intended as a definition of the limits of the invention.

DESCRIPTION OF THE PREFERRED EMBODIMENT

Figure 1:
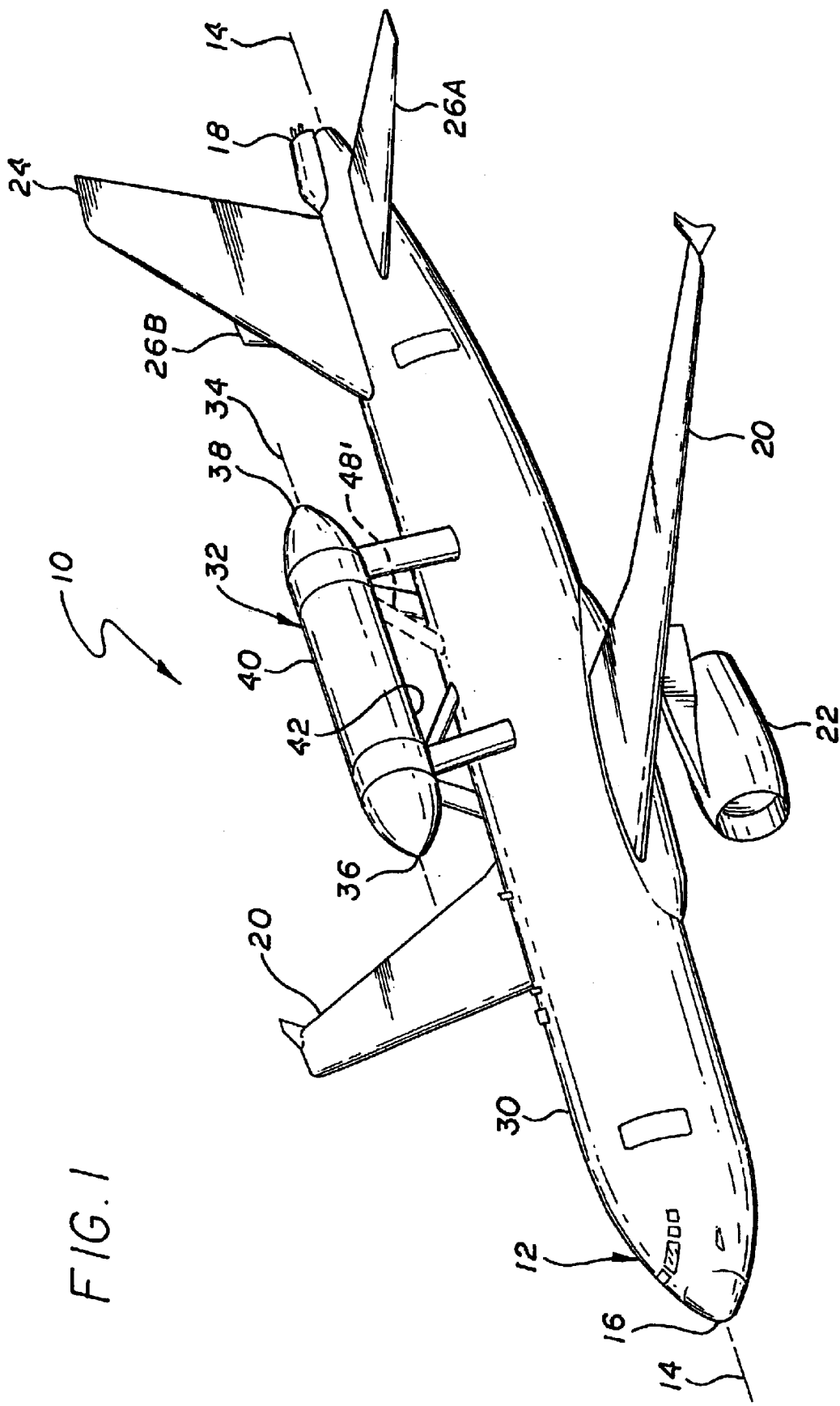
FIG. 1 is a perspective view of an aircraft having the pod mounted thereon.
Figure 2:
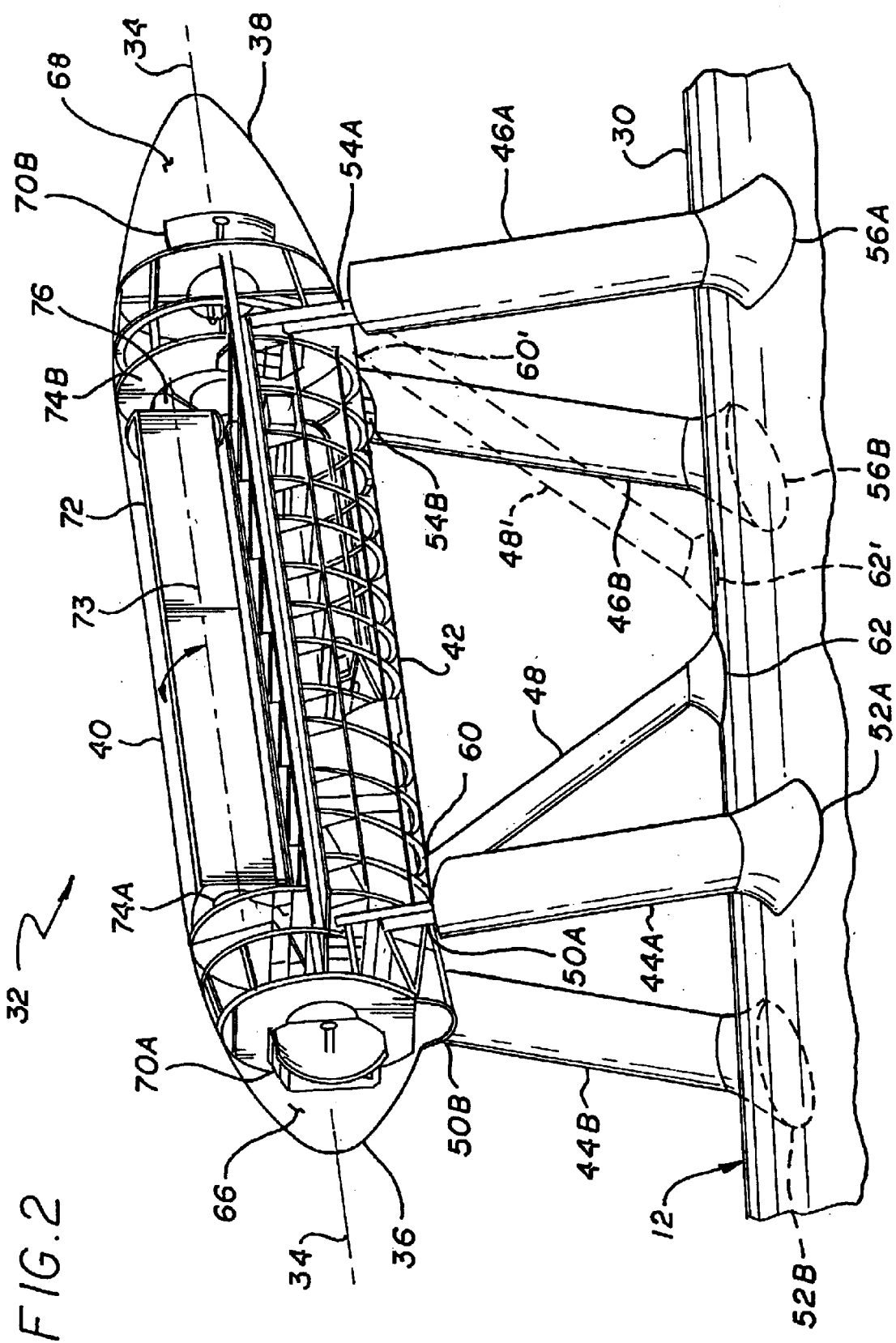
FIG. 2 is an enlarged perspective view of the pod shown in FIG. 1 partially broken away to show the interior thereof.

Depicted in FIGS. 1 and 2 is a transport type aircraft, generally designated by numeral 10. The aircraft 10 includes a fuselage 12 having a longitudinal axis 14, nose end 16, tail end 18. Mounted to the aircraft 10 are wings 20A and 20B having pylon mounted engine assemblies 22. The aircraft further includes a vertical stabilizer 24 and horizontal stabilizers 26A and 26B. Thus the transport aircraft 10 is of a conventional design.

Mounted to the top surface 30 of the fuselage 12 is an elongated (cigar shaped) sensor pod 32. The sensor pod 32 has a longitudinal axis 34 aligned with the longitudinal axis 14 of the aircraft 10 and includes a front end 36 rear end 38 and top and bottom surfaces 40 and 42. The pod 32 is supported by five structural supports in the form of struts, forward struts 44A and 44B and rear struts 46A and 46B and a center strut 48. The struts 44A and 44B have first ends 50A and 50B attached to the bottom surface 42 near the front end 36 of the pod 32 and extend outward with their second ends 52A and 52B attached to the top surface 30 of the aircraft 10 on either side of the longitudinal axis 14. The struts 46A and 46B have first ends 54A and 54B attached to the bottom surface 42 near the rear end 38 of the pod 32 and extend outward with their second ends 56A and 56B attached to the top surface 30 of the aircraft 10 on either side of the longitudinal axis 14.

In a first embodiment, the fifth strut 48 is aligned with the longitudinal axis 14 of the aircraft 10 and has a first end 60' attached to the bottom surface 42 of pod 32 near the forward struts 44A and 44B. The fifth strut 48 extends downward and rearward with its second end 62 attached to the top surface 30 of the aircraft. In a second embodiment, the fifth strut 48'0 is aligned with the longitudinal axis 14 of the aircraft 10 and has a first end 60' attached to the bottom surface 42 of pod 32 near the rear struts 46A and 46B. The fifth strut 48' extends downward and forward with its second end 62'0 attached to the top surface 30 of the aircraft. All of the struts 44A, 44B, 46A, 46B and 48, as well as the pod 32 itself, have an aerodynamic shape in order to minimize drag.

The front and rear ends 36 and 38 and the top surface 40 are made of composite assemblies that are made of materials transparent to electromagnetic radiation (radar signals and the like). The composite assemblies could be made of layers of Quartz prepreg cloth with honeycomb cores. In some instances it may be desirable to have the bottom surface 42 made of such material. This of course will depend upon the payloads within the pod. For example, it is contemplated that for one particular mission, the interior front portion 66 and interior rear 68 would contain dish type communication antennas 70A and 70B, while the middle top portion would contain a steered array antenna radar system 72. The radar system 72 is rotatable about an axis 73 parallel to the longitudinal axis 34 of the pod 32 supported by front and rear mounting structures 74A and 74B. The rear structure 74B includes a motor drive assembly 76 for rotating radar 72 from side to side.

Thus it can be seen that the sensor pod with five support struts distributed the loads induced by the pod over a large area of the fuselage. The elongated sensor pod also allows for a wide variety payloads, that can only be installed in circular and/or rotating circular radomes with great difficulty, if at all.

While the invention has been described with reference to a particular embodiment, it should be understood that the embodiments are merely illustrative, as there are numerous variations and modifications, which may be made by those skilled in the art. Thus, the invention is to be construed as being limited only by the spirit and scope of the appended claims.

INDUSTRIAL APPLICABILITY

The invention has applicability to the aircraft industry.

What is claimed is:

1. A sensor pod assembly for an aircraft, the aircraft having a fuselage with a longitudinal axis, wings, control surfaces and propulsion systems, the sensor pod comprising;

an elongated tubular shaped pod having a longitudinal axis aligned with the longitudinal axis of the aircraft having front and rear ends, said pod positioned above the fuselage of the aircraft; said pod including:
dish type communication antennas in said front and rear ends of said pod; and
a steered array radar antenna mounted in said middle top portion of said pod, said steered array antenna rotatable about said longitudinal axis of said pod;
first and second front structural supports having first ends coupled to the fuselage of the aircraft on either side of the longitudinal axis thereof and second ends coupled to the front end of said pod;
first and second rear structural supports having first ends coupled to the fuselage of the aircraft on either side of the longitudinal axis thereof and second ends coupled to the rear end of said pod; and
a fifth structural support aligned with the longitudinal axis of the aircraft having a first end attached to the fuselage of the aircraft a second end attached to the sensor pod.

2. The sensor pod assembly as set forth in claim 1 wherein said first end of said fifth structural support is mounted to the fuselage between said front and rear structural supports and extends rearward with said second end attached to said sensor pod between said rear structural supports.

3. The sensor pod assembly as set forth in claim 1 wherein said first end of said fifth structural support is mounted to the fuselage between said front and rear structural supports and extends forward with said second end attached to said sensor pod between said front structural supports.

4. The sensor pod assembly as set forth in claim 1, or 2 or 3 comprising said having an outer skin made at least partially from a material transparent to electromagnetic radiation.

5. The sensor pod assembly as set forth in claim 4 comprising said front and rear ends made of said material.

6. The sensor pod assembly as set forth in claim 5 were in a portion of the top half of said pod is made of said material.

7. The sensor pod assembly as set forth in claim 6 comprising the outer skin of said front and rear ends and the outer skin of at least a portion of the top half of said pod are made of said material.

8. The sensor pod assembly pod as set forth in claim 7 wherein said struts have an aerodynamic shape for reducing drag.

* * * * *